UNITED STATES PATENT OFFICE.

CHARLES M. HALL, OF OBERLIN, OHIO.

METALLIC ALLOY OR COMPOUND AND PROCESS OF PRODUCING SAME.

SPECIFICATION forming part of Letters Patent No. 570,014, dated October 27, 1896.

Application filed April 18, 1885. Renewed July 5, 1887. Serial No. 243,443. (Specimens.)

*To all whom it may concern:*

Be it known that I, CHARLES M. HALL, a citizen of the United States, residing at Oberlin, in the county of Lorain and State of Ohio, have invented a new and useful Improvement in Metallic Alloys or Compounds and Process of Producing the Same, of which the following is a specification.

My invention consists in the production of a metallic alloy or compound by compounding with copper, boron, and iron, or boron and any suitable equivalent of iron, using proper proportions of the respective substances named or of the equivalents of iron.

The alloy or compound is preferably made by mixing precipitated copper or finely-divided copper obtained in any manner with proper amounts of boracic acid, ferric oxid, and charcoal, making the whole into an intimate mixture, to which may be added borax, and heating the mixture to a high temperature. The charcoal reduces the ferric oxid and boracic acid to boron and iron, which are partially dissolved in the melted copper and partially crystallize out in what appears to be a crystalline borid of iron.

In making the alloy or compound I have varied the proportions of ingredients used rather widely. One mixture which I have found to produce good results is the following: copper, finely divided, ninety-six parts; boracic acid, twenty-eight parts; borax, four parts; ferric oxid, eight parts; charcoal, twelve parts, the mixture giving on reduction a compound or alloy containing, approximately, copper, eighty-nine per cent.; iron, six per cent.; boron, five per cent.

The addition of borax to the mixture is not absolutely essential, but it renders the reduction easier, its only office being on account of its containing soda, which, being reduced to sodium, reacts on the boracic acid. It is evident that ferric carbonate or ferric hydrate or iron in any suitable form may be substituted for the ferric oxid in the mixture.

The amount of iron used may be somewhat greater or much less than in the mixture named above, though it is difficult to make an even alloy when more is used; also the proportion of boron may be greater or much less than that named. The proportions named, however, are preferably adopted; but while this is the case my invention is not confined to any precise proportions, it being my intention to vary the proportions as circumstances may require, and substantially the same or an equivalent alloy can be produced when the proportions are varied.

When other metals are substituted for iron, such as manganese or nickel, the mixture is made containing manganese dioxid or nickel oxid, and heated as when the other mixture is used.

The essential constituents of the alloy or compound for lessening liability to corrosion are copper, boron, and iron, or some metal as a substitute for iron, of which manganese is the best, though inferior to iron, as manganese is related to iron and equivalent in its effect thereto in the compound. Nickel and chromium are also related to iron, and I have used them as equivalents in the compound, but they are inferior to both iron and manganese for the purpose. Cobalt also may possibly be used as a substitute for iron, or some suitable combination of two or more of these metallic substances, in which may be included iron, may be used with copper and boron in forming the compound.

It is evident that this compound, so formed of copper, boron, and iron or equivalent of iron, may be used as the basis for a large number of alloys or compounds, and I have so used it.

The above-named equivalents of iron for the purposes of this invention may be defined as being metals of the iron group, more electropositive than copper. Such metals are cobalt, nickel, manganese, and chromium. The strength and texture of the compound are greatly improved by the addition of aluminium; also its resistance to corrosion. I have also found the addition of zinc advantageous, and both zinc and aluminium, as well as other metals, either singly or together, may be added.

When other metals are to be added, the compound or alloy is first made separately, as above described. It is then melted in a separate crucible and the metal desired is added to it. I have added to the compound of copper, boron, and iron various proportions of aluminium, from one per cent. up to ten per cent. More than ten per cent. of aluminium renders the compound brittle. I have also added various proportions of zinc, from two per cent. up to forty per cent. I have also added both zinc and aluminium together to the alloy or compound. One combination which I have made, exhibiting the peculiar qualities of the alloy in a high degree, contains, approximately, copper, sixty-four per cent.; zinc, thirty per cent.; iron, two per cent.; boron, two per cent.; aluminium, two per cent.

The use of zinc is peculiarly advantageous in rendering the alloy homogeneous, as when it is used the crystalline borid of iron mentioned above is much more completely dissolved and uniformly combined with the other ingredients throughout the alloy. In adding the zinc the alloy is melted in a crucible and the zinc added in a solid or molten condition. To secure the best results, sufficient zinc is added to form from thirty-five per cent. to fifty per cent. of the total mass.

What I claim as my invention is—

1. A metallic alloy or compound of copper and boron and a metal of the iron group, substantially as described.

2. The process of making an alloy or compound, consisting in mixing copper with a proper quantity of boracic acid, charcoal and an oxid of metal of the iron group, and making the whole into an intimate mixture (to which mixture borax may be added) and heating to a high temperature; substantially as described.

3. A metallic alloy or compound of copper, boron, iron and zinc, substantially as set forth.

4. The process herein described which consists in forming an alloy of copper, boron and iron, and adding zinc to such alloy when in a molten condition, substantially as set forth.

CHARLES M. HALL.

Witnesses:
  H. B. HALL,
  CHAS. A. METCALF.